(12) United States Patent
Vestreli et al.

(10) Patent No.: US 9,232,874 B2
(45) Date of Patent: Jan. 12, 2016

(54) BEVERAGE PREPARATION MACHINE

(75) Inventors: Anders Vestreli, Obermeilen (CH); Christian Talon, Vufflens-le-Château (CH)

(73) Assignee: Nestec S.A., Vevey (CH)

(*) Notice: Subject to any disclaimer, the term of this patent is extended or adjusted under 35 U.S.C. 154(b) by 225 days.

(21) Appl. No.: 13/994,021

(22) PCT Filed: Dec. 13, 2011

(86) PCT No.: PCT/EP2011/072524
§ 371 (c)(1),
(2), (4) Date: Jul. 26, 2013

(87) PCT Pub. No.: WO2012/080204
PCT Pub. Date: Jun. 21, 2012

(65) Prior Publication Data
US 2013/0298777 A1   Nov. 14, 2013

(30) Foreign Application Priority Data
Dec. 13, 2010   (EP) .................................... 10194739

(51) Int. Cl.
A47J 31/00    (2006.01)
A47J 31/46    (2006.01)
B67D 1/12     (2006.01)
A47J 31/44    (2006.01)
A47J 31/58    (2006.01)

(52) U.S. Cl.
CPC *A47J 31/46* (2013.01); *A47J 31/44* (2013.01); *A47J 31/4457* (2013.01); *B67D 1/1247* (2013.01); *A47J 31/58* (2013.01)

(58) Field of Classification Search
CPC ...... B67D 1/1247; G01G 11/086; B01D 3/42; F28B 9/04; A47J 31/4457; A47J 31/58
USPC ............ 99/285, 280, 283, 305, 300; 137/395, 137/396, 402; 251/72, 338; 222/58, 66
See application file for complete search history.

(56) References Cited

U.S. PATENT DOCUMENTS

| | | | | |
|---|---|---|---|---|
| 5,375,739 A * | 12/1994 | Granfelt | | 222/56 |
| 6,067,894 A * | 5/2000 | Eugster | | 99/285 |
| 6,569,116 B1 * | 5/2003 | Wang | | 604/127 |
| 7,249,557 B2 * | 7/2007 | Fouquet | | 99/300 |
| 7,654,413 B2 * | 2/2010 | Chang | | 222/58 |

FOREIGN PATENT DOCUMENTS

| | | |
|---|---|---|
| DE | 2042241 | 3/1972 |
| EP | 0630603 | 12/1994 |
| GB | 2140286 | 11/1984 |

* cited by examiner

*Primary Examiner* — Reginald L Alexander
(74) *Attorney, Agent, or Firm* — K&L Gates LLP

(57) ABSTRACT

The present invention concerns a beverage preparation machine (1) having a tank (2) for containing a food-grade fluid, said tank comprising: (i) a reservoir body with side, bottom and top walls, (ii) at least one filling opening, (iii) at least one dispensing opening comprising a dispensing valve for establishing a fluid connecting between said machine and said tank, said tank having a weight WE when less than 5% of its total volume is filled, and a weight WF when at least 5% of its total volume is filled with fluid, said valve being reciprocally movable between a first position where the tank has a weight WE and the valve is open and a second position where the tank has a weight WF and the valve is closed characterized in that said machine comprises a switch disposed in the vicinity of at least one wall of the tank (2), so that: —when the tank has a weight WF said tank is in a first position so that it contacts said switch, and —when the tank has a weight WE said tank is in a second position, away from said switch, said machine further comprising a user warning means that is actuated when the switch does not contact the tank wall so as to warn the user that the tank needs a refill.

10 Claims, 3 Drawing Sheets

BEVERAGE PREPARATION MACHINE

CROSS REFERENCE TO RELATED APPLICATIONS

The present application is a National Stage of International Application No. PCT/EP2011/072524, filed on Dec. 13, 2011, which claims priority to European Patent Application No. 10194739.8, filed Dec. 13, 2010, the entire contents of which are being incorporated herein by reference.

FIELD OF THE INVENTION

The present invention concerns a beverage preparation machine, more particularly a beverage preparation machine with automatic detection of the water tank filling state.

BACKGROUND OF THE INVENTION

Beverage preparation machines are well known in the food science and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine of the invention is a beverage preparation machine working a rigid capsule.

The machine comprises a receptacle for accommodating said capsule and a fluid injection system for injecting a fluid, preferably water, under pressure into said capsule. Water injected under pressure in the capsule, for the preparation of a coffee beverage according to the present invention, is preferably hot, that is to say at a temperature above 70° C. However, in some particular instances, it might also be at ambient temperature. The pressure inside the capsule chamber during extraction and/or dissolution of the capsule contents is typically about 1 to 6 bar for dissolution products, 2 to 12 bar for extraction of roast and ground coffee. Such a preparation process differs a lot from the so-called "brewing" process of beverage preparation—particularly for tea and coffee, in that brewing involves a long time of infusion of the ingredient by a fluid (e.g. hot water), whereas the beverage preparation process allows a consumer to prepare a beverage, for instance coffee within a few seconds.

The principle of extracting and/or dissolving the contents of a closed capsule under pressure is known and consists typically of confining the capsule in a receptacle of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patent n° EP 1 472 156 B1, and in EP 1 784 344 B1.

Machines allowing the application of this principle have already been described for example in patents CH 605 293 and EP 242 556. According to these documents, the machine comprises a receptacle for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for circulating the water from the tank to the capsule, optionally though the heating element. The way the water circulates within the machine is selected via a selecting valve means, such as for instance a peristaltic valve of the type described in applicant's European patent application EP 2162653 A1.

When the beverage to be prepared is coffee, one interesting way to prepare the said coffee is to provide the consumer with a capsule containing roast and ground coffee powder, which is to be extracted with hot water injected therein.

Capsules have been developed for such an application, which are described and claimed in applicant's European patent EP 1 784 344 B1, or in European patent application EP 2 062 831.

In short, such capsules comprise typically:
 a hollow body and an injection wall which is impermeable to liquids and to air and which is attached to the body and adapted to be punctured by e.g. an injection needle of the machine,
 a chamber containing a bed of roast and ground coffee to be extracted,
 an aluminum membrane disposed at the bottom end of the capsule, closing the said capsule, for retaining the internal pressure in the chamber, the said membrane being associated with piercing means for piercing dispensing holes in the said aluminum membrane when said internal pressure inside the chamber reaches a certain predetermined value,
 optionally, means configured to break the jet of fluid so as to reduce the speed of the jet of fluid injected into the capsule and distribute the fluid across the bed of substance at a reduced speed. It is critical for the user to know when the water level in the machine tank is too low to prepare a full beverage.

GB 2140286 A is a British application to Alfredo Cavalli published Nov. 28, 1984. It discloses a beverage preparation machine comprising a water tank. The machine comprises a switch and a spring-mounted pivot lever mechanism which is linked between the tank and the switch. When the tank contains sufficient water, the tank presses onto one end of the sprung lever mechanism, and the opposite end of the lever presses onto the switch. When the tank is empty, or at least does not contain sufficient water, it is sufficiently light to be lifted by the sprung lever mechanism, and the lever end in contact with the switch is moved away from said switch so that the machine sends a signal to the user of the machine, for warning the user that a tank refill is needed.

This existing solution is quite expensive and complex: it uses a spring-mounted lever mechanism that can break after a certain number of usage cycles, so that the beverage machine may require maintenance. This requirement is particularly important as Moreover, the spring-mounted lever is expensive as it requires specific parts which are manufactured separately, and then assembled.

Other systems were developed in the art, to avoid the above mentioned problems. Such systems use sensors which measure the water level through ultrasonic detection or through a floating magnet inside the water tank and a sensor in the lower part of the tank, which detects when said magnet is moved down sufficiently as water is pumped from the tank.

Such systems however involve electronic parts which are costly and may also break so that they require maintenance. Additionally, such magnetic or ultrasonic sensors require energy to function, which is undesirable, as it increases the overall energy consumption of the machine.

Having regard to the existing art, it is an objective of the present invention to provide the consumers with a beverage preparation machine which is able to detect when its water tank is not sufficiently filled, while involving a detection system which is as simple, cheap, and reliable as possible.

SUMMARY OF THE INVENTION

The objectives set out above are met with a beverage preparation machine having a tank for containing a food-grade fluid, said tank comprising:
(i) a reservoir body with side, bottom and top walls,
(ii) at least one filling opening,
(iii) at least one dispensing opening comprising a dispensing valve for establishing a fluid connecting between said machine and said tank,
said tank having a weight $W_E$ when less than 5% of its total volume is filled, and a weight $W_F$ when at least 5% of its total volume is filled with fluid, said valve being reciprocally movable between a first position where the tank has a weight $W_E$ and the valve is open and a second position where the tank has a weight $W_F$ and the valve is closed characterized in that said machine comprises a switch disposed in the vicinity of at least one wall of the tank, so that:
when the tank has a weight $W_F$ said tank is in a first position so that it contacts said switch, and
when the tank has a weight $W_E$ said tank is in a second position, away from said switch,
said machine further comprising a user warning means that is actuated when the switch does not contact the tank wall so as to warn the user that the tank needs a refill.

This switch solution is cheaper than existing water level sensors and more robust. Particularly, it does not require a complex construction, so that the risk of system failure is reduced, and maintenance is also reduced. The switch can be a mechanical switch, a contact switch, or a proximity sensor.

In a highly preferred embodiment of the present invention, the valve is a poppet valve. Such a poppet valve is a classical spring-mounted poppet valve as is well known in the art. Such a poppet valve is a valve consisting of a hole—in the present invention, the hole is the dispensing opening of the tank—, usually round or oval, and a tapered plug, usually a disk shape on the end of a shaft also called a valve stem. The shaft guides the plug portion by sliding through a valve guide. In most applications a pressure differential helps to seal the valve and in some applications also open it. In the present case, the pressure application is determined by the weight of the tank, that is to say, by the filling state of said tank.

The spring-mounted poppet valve is disposed at the dispensing opening of the tank, such that its valve stem rests onto the machine surface, and its spring is in contact at one end with the valve stem, and on the other end with the reservoir. In this way, the tank is moved away from the sensor by the spring of the poppet valve when said tank contains too little water so that its weight is too low. When one fills the tank with water, the tanks weight increases sufficiently to counterbalance the spring force, so that the tank presses back towards the machine and the switch.

When the tank is empty and positioned away from the switch, said switch actuates a display system in the machine that warns the user about the empty state of the tank. Such a display can be for instance a LED that lightens up, a synthetic voice message, a more complex system such as a screen which displays a written message to the user, or a combination thereof.

In one embodiment, the detection by the machine of the empty state of the tank, actuates a pump of the beverage preparation machine, which pumps fresh water from the water main network of the house, into the tank. In such a case, the beverage preparation machine comprises a fluid connection to the said house water network.

Preferably, the tank is removable from said machine. The tank is preferably a thermoplastic part, made from polycarbonate, polyethylene, polystyrene or the like.

Advantageously, the food-grade fluid is pumped by the machine from said tank, to prepare a beverage by dissolving, infusing, and/or extracting at least one beverage precursor ingredient present in said machine.

Preferably, said at least one beverage precursor ingredient is contained in a container selected within the list of: soft pods, soft pads, soft sachets, rigid or semi-rigid capsules.

Also advantageously, said beverage precursor ingredient is selected within the list of: gas, liquids, gels, granulates, agglomerated or non-agglomerated powder, herbal extracts such plant leaves and/or stems, ground beans, or a combination thereof.

Preferably, the tank has a filling volume comprised between 0.5 and 5 liters, preferably between 1.2 liters and 2.5 liters. Such a volume corresponds to the volume of water that is used for preparing and serving at least 5 to 6 cups of 150 to 200 ml or 3 to 4 large cups of a brew-like coffee for instance, without having to refill the said reservoir.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
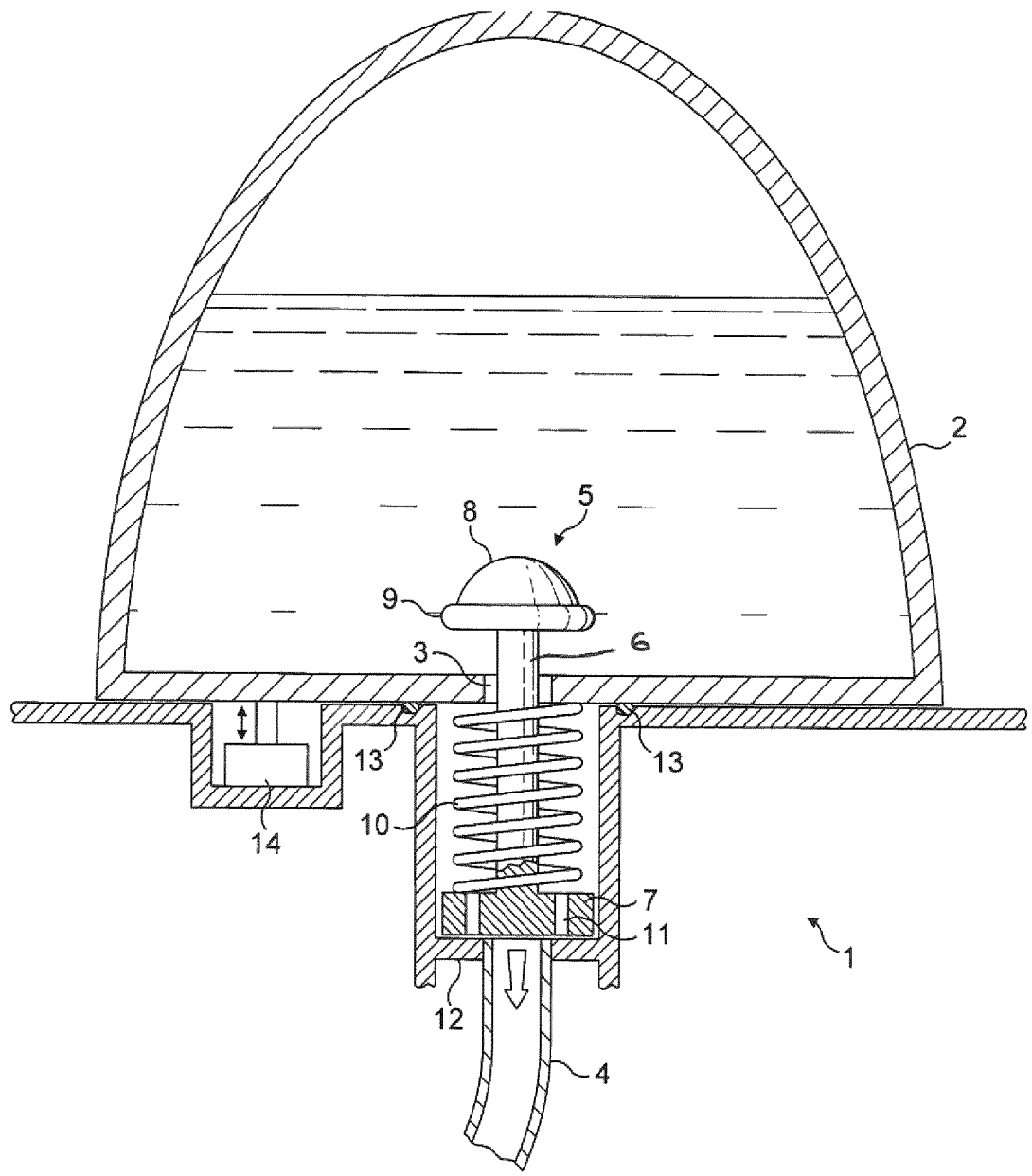
FIG. 1 is a schematic profile cut view of a beverage machine according to the invention with a tank that is filled with water.

As illustrated in FIG. 1, the beverage preparation machine 1 of the Invention—not represented entirely in the drawing—comprises a water tank 2 mounted in a removable manner onto a specific recess of the machine 1.

Figure 3:
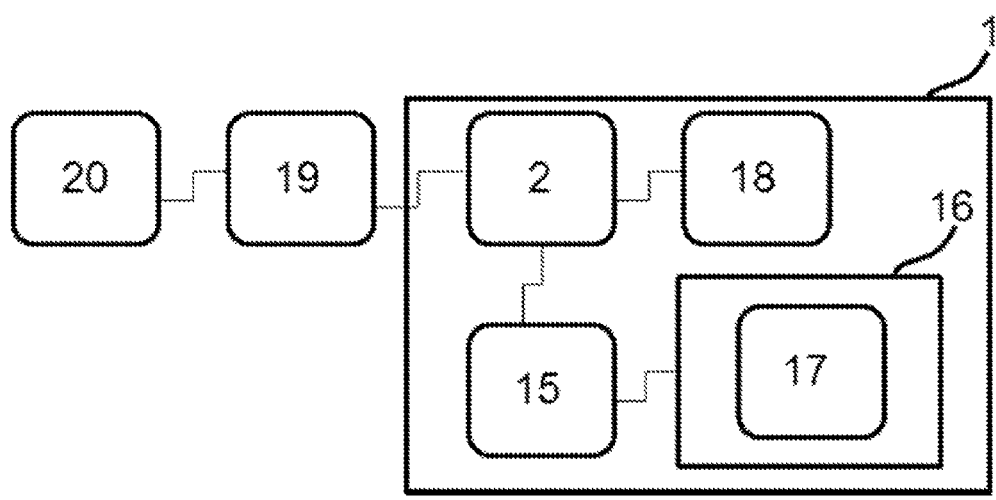
FIG. 3 is a schematic view of the beverage preparation machine according to one embodiment.

The tank 2 comprises a filling opening—not illustrated in the drawing—and a dispensing opening 3 that is designed to be in fluid communication with an inlet pipe 4 of the beverage machine. According to the embodiment illustrated in FIG. 3, the inlet pipe 4 is linked to a pump 15 of the machine which circulates the fluid from the tank through the machine, towards an extraction head 16 of the machine wherein a capsule 17 containing a food ingredient is accommodated.

The dispensing opening 3 of the tank 2 comprises a puppet valve 5 for selectively opening or closing said dispensing opening, depending on the weight of the tank—that is to say depending on the filling state of the tank—.

The puppet valve 5 comprises a valve stem 6 with a stem base 7, a stem head 8 having a domed shape, and stem seal 9 which is an O-ring seal disposed around the lower edge of the stem head 8.

The puppet valve 5 further comprises a valve spring 10 which, as illustrated in FIG. 1, is disposed in a compression state between said water tank 2 and said machine 1.

The stem base 7 comprises a series of through holes 11 which allow a fluid circulation of water from the tank 2 to the machine pipe 4, even though said stem base 7 rests against an edge 12 of the machine, as illustrated in FIG. 1.

When the tank 2 is filled with water as shown in FIG. 1, its weight $W_F$ is sufficient to force the said tank against the machine inlet pipe opening, against the force of the valve spring 10. In that case, the interface between the tank and the machine is leaktight, due to the presence of a sealing O-ring 13, which is mounted on the tank and/or the machine at the vicinity of the tank dispensing opening 3.

In that configuration, as illustrated in FIG. 1, a switch 14 is pressed down by contact with the tank 2. The switch 14 is linked to a data control switch system board or chip—not shown in the drawing) disposed within the machine 1. When the switch 14 is in the compressed position, as in FIG. 1, the switch board detects that the tank is pressing it down, which means that the said reservoir is sufficiently filled.

Figure 2:
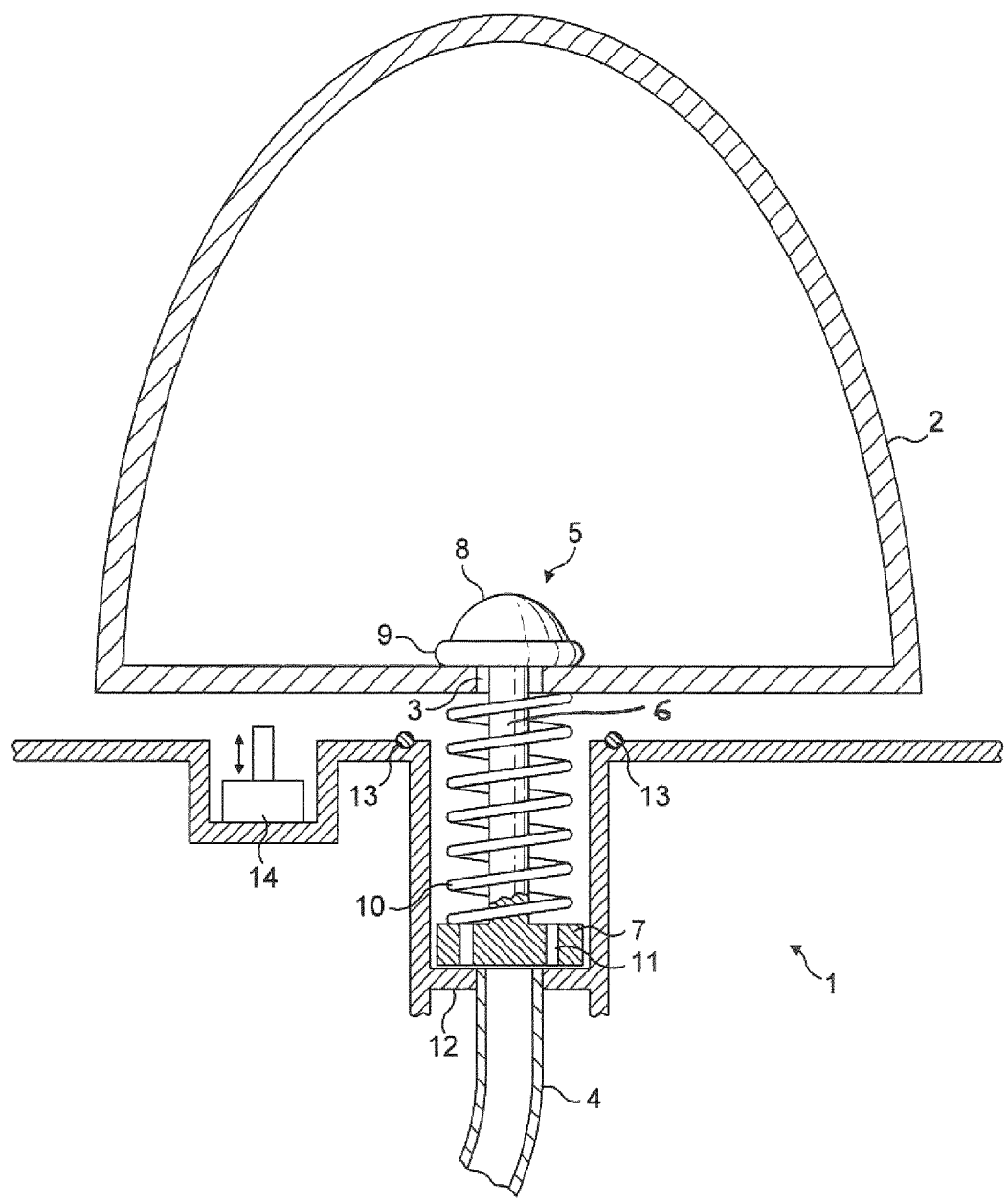
FIG. 2 is a schematic profile cut view similar to FIG. 1, wherein the reservoir is empty.

When the tank 2 is empty, or almost empty, as illustrated in FIG. 2, its weight $W_E$ is insufficient to counter the upward force imposed onto the tank by the valve spring 10, so that the tank is moved away from the machine. More particularly, the tank is moved away from the switch. As shown in FIG. 2, the switch moves up as no force presses it, which position is detected by the switch board and interpreted as "reservoir empty". In that case, the data control board actuates a message on a display 18 (or turns a light on) to ask the consumer to fill the tank again. According to the embodiment illustrated in FIG. 3, the detection by the beverage preparation machine 1 of the empty state of the tank 2 actuates a pump 19 of the beverage preparation machine 1, which pumps fresh water from the water main network 20 of the house, into the tank 2.

This water level detection:
uses the spring which opens and closes the water tank when tank is connected to the machine
only requires a simple electrical switch.

When the water level decreases in the tank, the weight of the tank also decreases.

When this weight reaches a critical weight, the water connector spring lifts the tank so that the detection switch is activated, and an indication is given to the user about low water level.

The spring 10 force is adjusted appropriately depending on the weight of the tank $W_E$ (weight of the tank in its empty state), such that said spring is strong enough to move away the tank from the machine, but not strong enough to move the said tank away from the machine, as soon as the tank contains a minimal amount of water (typically, as soon as at least 10 ml of water is present in the tank, the said tank is heavy enough to push the valve spring down and actuate the switch.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A beverage preparation machine comprising:
   a tank for containing a food-grade fluid, the tank comprising: a reservoir body with side, bottom and top walls, at least one dispensing opening comprising a spring-mounted poppet valve for establishing a fluid connection between the machine and the tank, the spring-mounted poppet valve comprising a stem head, a valve stem resting onto a surface of the machine, and a spring that is in contact at one end with the valve stem and on the other end with the reservoir, the tank having a weight $W_E$ when less than 5% of its total volume is filled, and a weight $W_F$ when at least 5% of its total volume is filled with fluid, the valve being reciprocally movable between a first position where the tank has a weight $W_E$ and the valve is closed by the spring pushing the reservoir body into contact with the stem head, and a second position where the tank has a weight $W_F$ and the valve is opened by the reservoir body compressing the spring and moving out of contact with the stem head;
   a switch located in the vicinity of at least one wall of the tank, so that: when the tank has a weight $W_F$ the tank is in a first position so that the tank wall contacts the switch, and when the tank has a weight $W_E$ the tank is in a second position, away from the switch; and
   a user warning device that is actuated when the switch does not contact the tank wall so as to warn the user that the tank needs a refill.

2. A beverage preparation machine according to claim 1, wherein the tank is removable from the machine.

3. A beverage preparation machine according to claim 1 comprising a pump, an extraction head for accommodating a capsule, and a fluid injection system configured to inject a fluid under pressure into the capsule, wherein the food-grade fluid is pumped by the machine from the tank, to prepare a beverage by dissolving, infusing, and/or extracting at least one beverage precursor ingredient present in the machine.

4. A beverage preparation machine according to claim 3, wherein the at least one beverage precursor ingredient is contained in a container selected from the group consisting of: soft pods, soft pads, soft sachets, rigid and semi-rigid capsules.

5. A beverage preparation machine according to claim 3, wherein the beverage precursor ingredient is selected from the group consisting of: gas, liquids, gels, granulates, agglomerated or non-agglomerated powder, herbal extracts such plant leaves and/or stems, ground beans, and combinations thereof.

6. A beverage preparation machine according to claim 1, wherein the tank has a filling volume of between 0.5 and 5 liters.

7. A beverage preparation machine according to claim 1, wherein when the tank is located away from the switch, the switch actuates a display system in the machine that warns the user about the empty state of the tank.

8. A beverage preparation machine according to claim 7, wherein the display is selected from the group consisting of a LED lamp, a synthetic voice message, a screen which displays a written message to the user, or a combination thereof.

9. A beverage preparation machine according to claim 1, which comprises a fluid connection to the house water network, and a pump linked to the connection, the pump being actuated by detection of the empty state of the tank actuates the pump, so as to pump fresh water from the house water network, into the tank.

10. A beverage preparation machine according to claim 1 comprising at least one filing opening.

\* \* \* \* \*